Dec. 3, 1963   L. R. POE   3,112,547
FASTENER
Filed Nov. 15, 1960

INVENTOR
LLOYD R. POE
BY
ATTORNEYS

United States Patent Office 3,112,547
Patented Dec. 3, 1963

3,112,547
FASTENER
Lloyd R. Poe, Los Angeles, Calif., assignor to Hartwell
Corporation, a corporation of California
Filed Nov. 15, 1960, Ser. No. 69,459
3 Claims. (Cl. 24—211)

This invention relates to an improved expansion type fastener for detachably securing or positioning one member on another.

Plunger actuated expansion type fasteners are known in the prior art. A fastener of this type in which the plunger actuator is a permanently installed part of the fastener is described in my copending application Serial No. 24,962, filed on April 27, 1960.

The fastener described in the application referred to works very well in the many situations for which it is intended. Since that invention was made, however, new requirements have arisen for which fasteners of the same general type are desirable but for which, because of space limitations, the fastener described cannot be used.

The purpose of my present invention is to provide a plunger actuated expansion type fastener which is particularly suited for use where there is very limited space available inside of the member on which a removable member is to be fastened.

In my present invention, the plunger, although still a permanently installed part of the fastener, is adapted for operation completely within the fastener so that overall fastener length in the fastened position is substantially reduced.

A fastener according to my invention has a fastener part and a plunger or expander part. The fastener part, connected at one end to a first member, has an expander aperture therethrough in which the expander part is movably arranged. The fastener part has an expansible and collapsible portion adjacent the periphery of the expander aperture. This portion extends axially of the fastener away from the first member. Raised shoulders which project radially inwardly from the expansible and collapsible portion are also provided in the fastener part adjacent the expander aperture.

The second member, such as a thin wall or panel section, on which the first member is to be secured, is provided with a receiving aperture for the fastener. The expansible and collapsible portion of the fastener has normal dimensions such that it is freely insertable into the receiving aperture when the first member is positioned. The dimensions are also such that the same portion projects beyond the wall or panel section when it has been inserted in place for fastening.

The expander part has a cylindrical plunger with a large diameter end section for operating the fastener. The expander is depressed or moved axially in the direction of the second member, from the first for fastening. When the ends of the expansible portion bear against the large diameter end section of the expander, the fastener part is expanded to a diameter greater than that of the receiving aperture. In this position, the expansible portion cannot be withdrawn and the first member is secured in place.

Immediately inward of the expander end section the plunger has a reduced diameter section adapted so that the plunger can move axially between fastened and released positions without interference with the inner shoulders mentioned. Another shoulder or flange is provided at the juncture of the reduced diameter and end sections. The outside diameter of the end section and hence of this flange is greater than the inside diameter of the inner raised shoulders.

For releasing, the expansible portion is collapsed to its normal dimensions by withdrawing the end section of the expander from the ends of the expansible portion. The expander is moved reversely until the flange at its end section bears against the inner raised shoulders, whence the fastener can be simply withdrawn from the receiving aperture.

A fastener according to my invention can be provided in many sizes and materials for many purposes. It can be permanently installed for use as a latch type fastener in for example, a panel or strap which is to be releasably secured. It can be permanently installed in or made part of a bracket type member which is to be releasably attached to a supporting wall or panel surface. And, most importantly, the fastener can be used where there is a minimum of space available inside the supporting wall or panel. Sufficient depth beyond the receiving aperture to permit insertion of the expansible portion of the fastener is all that is required. The end of the plunger or expander part does not project beyond the expansible portion in the fastened position.

This new fastener is simple to fabricate from inexpensive materials. It is easily installed. It operates quietly and requires no lubrication. Moreover, my new fastener has good holding ability and its operation is entirely rational, i.e., force exerted on the expander part to expand the fastening part also acts to close the panels or other members upon each other, and force exerted on the operating member to unlock the fastener also acts to separate the panels or members.

These and other features of the invention will be explained in detail in the following description of a particular embodiment of the invention. In the description reference is made to the accompanying drawing in which.

Figure 1:
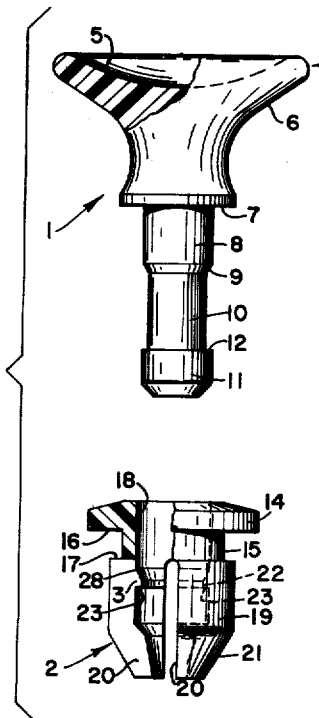
FIG. 1 is a side view, partly in section, of the components of an embodiment of the plunger-actuated expansion-type fastener of my invention, the two expander and fastener parts of the embodiment being shown separated to illustrate fully their construction.

Referring now to FIG. 1 the two parts of my new fastener are shown in an exploded view so that all their details may be readily observed. The plunger or expander part is shown at 1 and the expansible fastener part is shown at 2. In this particular embodiment both parts 1 and 2 are generally circular in cross-section throughout their lengths. This is readily apparent with respect to the expandable part from an examination of FIG. 2.

The plunger comprises a handle 4 shaped so that it may be conveniently pushed and pulled in the direction of the longitudinal axis of the fastener. To this end the top surface of the handle shown is made slightly concave, as indicated at 5 to fit the contour of the ball of the thumb but many types of handle arrangements may be used. The external contours of the handle 4 are made generally conical, as indicated at 6, so that the handle may be conveniently grasped and pulled with the thumb and fingers. A cylindrical part 8, co-axial with the handle 4, extends from the handle. The diameter and length of this cylindrical part 8 will, in due course, be related to certain dimensions of the expandable part 2.

At the cross section of the plunger where the cylindrical part 8 joins the handle 4 there is a shoulder 7, the external diameter of which is greater than the diameter of cylindrical part 8. At the end of the cylindrical part 8 opposite the handle 4 there is a truncated conical part 9 the diameter of which decreases from its juncture with the cylindrical part 8. Extending co-axially from the conical part 9 there is a straight cylindrical part 10, the diameter of which is the same as the small diameter of the part 9 and which will also be related to certain dimensions of the expandable part 2 subsequently.

At the end of the plunger opposite the handle there is an end section 11 the diameter of which is substantially the same as the diameter of the cylindrical part 8, and is accordingly greater than the diameter of the cylindrical part 10. Thus, there is formed an annular flange or shoulder 12 at the juncture between these two parts.

The entire plunger may be made of any suitable material such as plastic, metal, or hardwood and may be conveniently moulded, cast or machine-turned in one piece.

The expansible part 2 is provided with means for mounting it either temporarily or permanently. This particular embodiment of the invention is designed to be mounted in a circular hole in a panel (such as shown at 24 and 27 in FIGS. 3 and 4) which is thin and flat in the immediate vicinity of the mounting hole. The part 2 is provided with a grommet-like head comprising a flat ring-like part 14, the external diameter of which is somewhat greater than the hole in which the part is to be mounted. Depending co-axially from the ring 14 there is a reduced cylindrical part 15, the diameter of which can be substantially the same as, or less than, the diameter of the hole 27 in which the part is to be mounted.

This relation results in an annular shoulder 16 at the cross section between the ring 14 and the cylindrical part 15.

Figure 2:
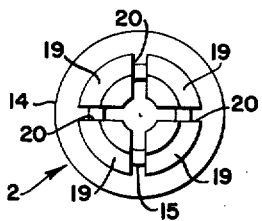
FIG. 2 is a bottom view of the expandable part of the embodiment of FIG. 1.

There are fixed to and depending from the cylindrical part 15 a plurality of separate fingers the shapes of which may more readily be seen if FIGS. 1 and 2 are considered together. Generally, these fingers taken together form a cylindrical extension which is co-axial with the ring 14 and the cylindrical part 15, but they are separated from each other by longitudinally extending cuts or slots indicated at 20 in FIGS. 1 and 2. In this embodiment the slots are placed at the cardinal points about the axis of the part so that four fingers 19 are formed. The resiliency of the material from which the expandable part 2 is formed and the requirements of the particular application may make it desirable to form more or less than four such fingers.

The main portions of fingers 19 extend substantially parallel to the axis of the part and the outer diameter along the main portion is made somewhat greater than the diameter of the cylindrical part 15 so that there is formed at the juncture between the fingers and the cylindrical part 15 an annular shoulder 17. The shoulders 16 and 17, separated as they are by the cylindrical part 15, form a mounting means similar to a grommet. As shown, elasticity of the material used permits part 2 to be forced through a hole 27, smaller in diameter than the outside diameters of either the shoulder 16 or the shoulder 17, so that a panel is received within the annular groove between shoulders and the fastener is held permanently and securely in place.

Other mounting means may be provided. For example, also as for a permanently installed latch, the part 2 may be provided with radially extending ears which may be screwed or riveted to the member on which the part is to be mounted.

For installations where precise aligning of panels or the like is required, the diameter of cylindrical part 15 is made equal to the diameter of mounting aperture 27. When installed, the fastener is tightly fitted in the receiving aperture.

Figure 3:
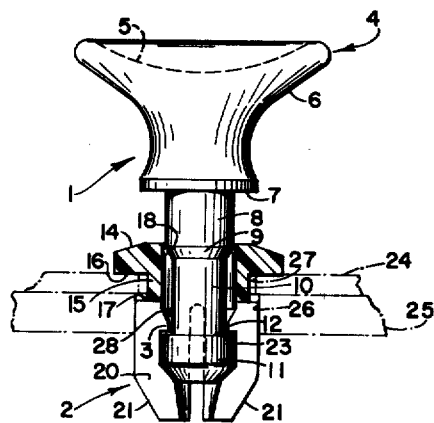
FIG. 3 is a side view (partly broken away) of the embodiment of FIG. 1, in which the fastener is shown mounted and in the released position.

In the embodiment shown, the diameter of cylindrical portion 15 is less than that of hole 27. This feature is advantageous when only approximate pre-positioning of members, such as panels 24 and 25 in FIG. 3, is necessary. The fastener is movable between positions where its longitudinal axis coincides with the axis of the mounting or of the receiving aperture and small amounts of mis-alignment can be accommodated.

The free ends of the fingers 19 terminate in turned-in portions 21 so that the lower end of the part 2 is then generally frustro-conical. The expander aperture 18 through the expandable part 2 is cylindrical and has substantially the same diameter as the diameter of the cylindrical body 8 and the end section 11 of the plunger. For some applications it may be desirable to make the diameter of expander aperture 18 slightly less than the diameter of the body 8 so that there is a moderate frictional contact between the parts when they are assembled. The opening through the expandable part 2 of course continues from expander aperture 18 through the finger portions 19. This opening decreases in diameter over that portion (shown at 21) of the length of the fingers which is turned inward toward the axis adjacent the bottom end of each finger.

At the upper or root portions of fingers 19 a plurality or said shoulders 3 are provided. These shoulders are integral with the inner walls of expander part 2 and are adjacent the lower end of expander aperture 18. They extend radially inwardly of the opening in the expander part and comprise stops for limiting outward axial movement of expander 1. The inside faces 22 of shoulders 3 are rounded to conform to the shape of cylindrical portion 10 of the plunger. The diameter or distance between opposite faces 22 is less than that of expander aperture 18 and equal to that of cylindrical portion 10.

The lower surfaces 23 of shoulders 3 are horizontal and are spaced from the inturned ends 21 of fingers 19 by a distance roughly equivalent to the distance the plunger must move between fastened and released positions. The length of reduced diameter portion 10 of the plunger is in turn made approximately equivalent to this same distance so that plunger portion 8 will not interfere with the shoulders 3 and restrict plunger travel.

I have described these dimensions as approximately equivalent because the length of plunger end section 11 actually determines how for the plunger must move between fastened and released positions. Also, the thickness of shoulders 3 would have to be included in the length of reduced diameter portion 10 to insure non-interference by plunger portion 8. Accurate determination of particular dimensions is a simple arithmetic problem once the requirements for a particular fastener are known. The important requirements are that the length of reduced diameter portion 10 must be at least as long as the maximum axial travel distance of the plunger and that the lower surfaces 23 of shoulders 3 must not be engaged by shoulder 12 of the plunger until the end of the plunger has been withdrawn from the ends of fingers 19 to release the fastener.

In the drawings, upper surfaces 28 of shoulders 3 are shown inclined as are the lower edges of end section 11. These are matters of convenience for ease of assembly. Thus, when expander or plunger part 1 is inserted into expander aperture 18, it may be easily pushed into position with end section shoulder 12 below the horizontal surfaces 23. Once in place, the shoulders will hold the plunger from dropping out and it can not be inadvertently withdrawn from fastener part 2.

Expansible part 2 as shown is formed of an elastic and resilient material such as any suitable synthetic resin. It can also be formed of flexible metal for other types of installations. I have found that both the plunger 1 and the expandable part 2 may be advantageously formed of nylon, for it may be easily molded, it may be made highly resilient and elastic, and it resists abrasion and wear remarkably well.

In FIG. 3, I show the expansible part 2 mounted, as described above, in a panel indicated at 24. The expander part is shown inserted into the expansible part. This assembly is accomplished merely by inserting the end section 11 of the plunger into the grommet-like head of the expansible part 2 and then pushing the plunger. As the end 11 is pushed through shoulders 3 it will cause the fingers 19 to expand and when the end 11 passes beyond the shoulders 3, the fingers will snap back into their normal or unexpanded position. In this condition the turned-in ends 21 of the fingers are beyond the end of the plunger. Any attempt to withdraw the plunger from the expandable part without deliberately forcing the fingers outward is resisted by the lower surfaces 23 on shoulders 3 bearing against the surface 12 of the plunger end section.

Figure 4:
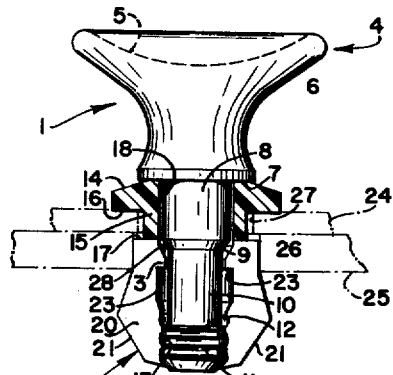
FIG. 4 is a side elevation (partly broken away) of a modification of the fastener of FIG. 3 in the fastened position.

To illustrate the operation of my new fastener suppose that the member 24 in which the expansible fastening and aligning part 2 is mounted in a hinged door panel, and suppose that the member 25 is a fixed wall panel having a receiving aperture 26 therein. With the expander part 1 and the expansible part 2 in the relative positions shown in FIG. 3 the fingers 19 are not expanded and their external diameter is substantially the diameter of the receiving aperture 26. When the door panel is closed on the wall panel the expansible part is inserted into the aperture 26 in the wall panel and the door and wall panels 24, 25 are in overlapped relation as shown in FIGS. 3 and 4. Then the expander part 1 is pushed inwardly by means of the handle 4. The inturned ends of the fingers 19 ride up onto the sides of end section 11 thereby forcing the main portions of the fingers 19 to bend outwardly. The result is that the expansible part is now larger in outside diameter than the diameter of the receiving aperture 26 so that the expansible part may not pass back through the wall panel. All this is clearly illustrated in FIG. 4.

As is also shown only at 13 in FIG. 4, one or more mating ridges and grooves may be used on the fingers 19 and on the outside of end section 11 to resist displacement of the expander part by vibration and all other actions other than deliberately axially directed force on the handle. However, when it is desired to open the door panel, a moderate pull on the handle 4 will be sufficient to withdraw the expander part 1 so that the fingers ride down the end of plunger 1 and return to their normal diameter. Further pulling on the handle will result in engagement of shoulder surfaces 23 with plunger shoulder 12 and the pulling force is then transferred through the expansible part to the door panel to open it.

Many other uses and many structural modifications of my new fastener will be apparent. Accordingly, the scope of the invention is not to be limited by the foregoing details. The scope of my invention is as set forth in the following claims.

I claim:

1. A fastener for detachably securing together in superposed relation a first member having a fastener mounting aperture therethrough and a second member having a fastener receiving aperture therein, said mounting and receiving apertures being in register when said first and second members are in predetermined lapped relation, which fastener comprises: an aligning and fastening part having a body adapted to be secured at the mounting aperture of said first member, said body having an expander aperture therethrough and having an expansible portion fixed to said body adjacent the periphery of said expander aperture and extending away therefrom, said expansible portion comprising a plurality of separate elongated fingers extending from said body generally in the direction of the axis of said expander aperture, the lower ends of said fingers being inturned towards the said axis, the normal external dimensions of said expansible portion being such that said fingers are freely insertable into the receiving aperture in said second member, and a plurality of radially inwardly extending coplanar shoulders adjacent the periphery of said expander aperture on the inner side of said fingers, the inside diameter of said shoulders being less than that of said expander aperture; and an expander part slidably supported in said fastening part in the expander aperture thereof, said expander part having portions of different radial dimensions such that in one axial position thereof the external dimensions of said expansible portion fingers are normal and in another position said fingers are forced, by engagement of a portion of said expander part with said inturned ends of said fingers, radially outwardly by an amount which is sufficient to restrain the passage of said expansible portion through said receiving aperture, and at least one of said expander part portions having a radial dimension greater than the inside diameter of said shoulders so that said one expander part portion interferingly engages with said shoulders when said expander part is in said one axial position.

2. A fastener according to claim 1 in which said expander part comprises an upper cylindrical portion having a diameter equivalent to the inside diameter of said expander aperture, an integral intermediate cylindrical portion coaxial with said upper cylindrical portion and having a diameter equivalent to the inside diameter of said shoulders, and an integral end section coaxial with said cylindrical portions at the distal end of said intermediate cylindrical portion, said end section also being cylindrical and having an annular surface at the end thereof where said end section joins said intermediate portion, said expander part being slidable axially between a position of engagement of said annular surface with said inwardly extending shoulders when the external dimensions of said fingers are normal and a position of engagement of said finger lower ends with the outside of said end section when the fastener is in the fastened position, said expander part being of such a length that it is entirely enclosed by said elongated finger members when said expander part is in the fully inserted position.

3. A fastener according to claim 1 in which said expander part comprises an upper cylindrical portion having a diameter equivalent to the inside diameter of said expander aperture, an integral intermediate cylindrical portion coaxial with said upper cylindrical portion and having a diameter equivalent to the inside diameter of said inwardly extending shoulders, and an integral end section coaxial with said cylindrical portions at the distal end of said intermediate cylindrical portion, said end section also being cylindrical and having an annular surface at the end thereof where said section joints said intermediate portion, said expander part being slidable axially between a position of engagement of said annular surface with said inwardly extending shoulders when the external dimensions of said fingers are normal and a position of engagement of said finger lower ends with the outside of said end section when the fastener is in the fastened position, said expander part being of such a length that it is entirely enclosed by said elongated finger members when said expander part is in the fully inserted position, the outer surface of said end section having a plurality of circumferentially disposed grooves therein and the inner surfaces of said finger lower ends having a plurality of ridges extending radially inwardly therefrom, which ridges are adapted to engage said grooves when said expander part is in said position of engagement.

References Cited in the file of this patent

UNITED STATES PATENTS

| | | |
|---|---|---|
| 1,210,337 | McIntyre | Dec. 26, 1916 |
| 2,336,153 | Ryder | Dec. 7, 1943 |
| 2,592,130 | Erb et al. | Apr. 8, 1952 |
| 2,616,328 | Kingsmore | Nov. 4, 1952 |
| 2,737,406 | Brookbank | Mar. 6, 1956 |
| 2,741,938 | Johnson | Apr. 17, 1956 |
| 2,926,409 | Perry | Mar. 1, 1960 |
| 2,937,834 | Orenick et al. | May 24, 1960 |
| 2,997,910 | Tinnerman | Aug. 29, 1961 |

UNITED STATES PATENT OFFICE
CERTIFICATE OF CORRECTION

Patent No. 3,112,547            December 3, 1963

Lloyd R. Poe

It is hereby certified that error appears in the above numbered patent requiring correction and that the said Letters Patent should read as corrected below.

Column 4, line 21, for "or said" read -- of raised --; line 41, for "for" read -- far --; column 6, line 46, for "joints" read -- joins --.

Signed and sealed this 2nd day of June 1964.

(SEAL)
Attest:

ERNEST W. SWIDER            EDWARD J. BRENNER
Attesting Officer            Commissioner of Patents